June 30, 1964  W. A. JACOBS ETAL  3,138,826
SEMI-AUTOMATIC FORMING MACHINE AND PROCESS
Filed Oct. 12, 1961  4 Sheets-Sheet 1

INVENTORS
William A. Jacobs
Kenneth A. Hornung
BY Fisher, Christen and Sabol
ATTORNEYS

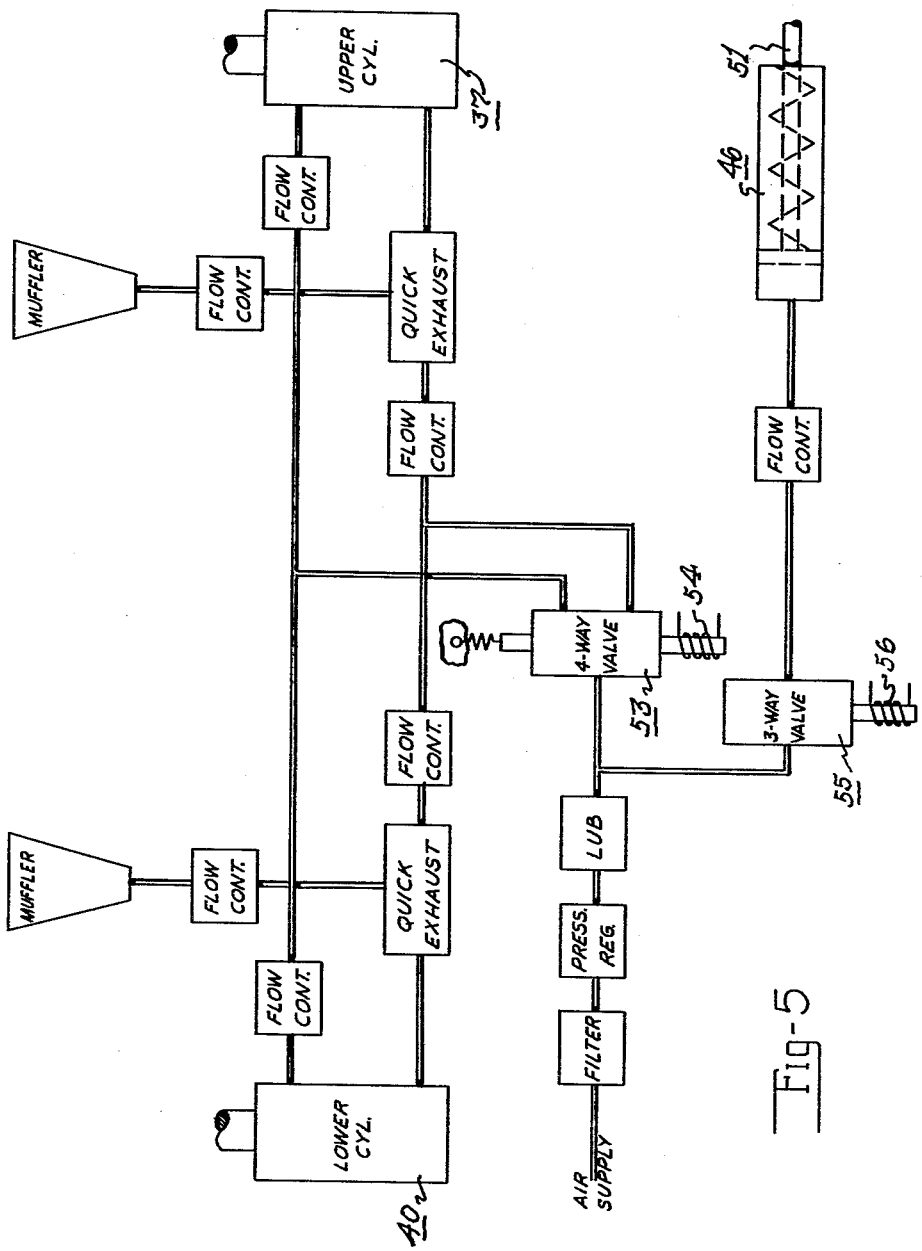

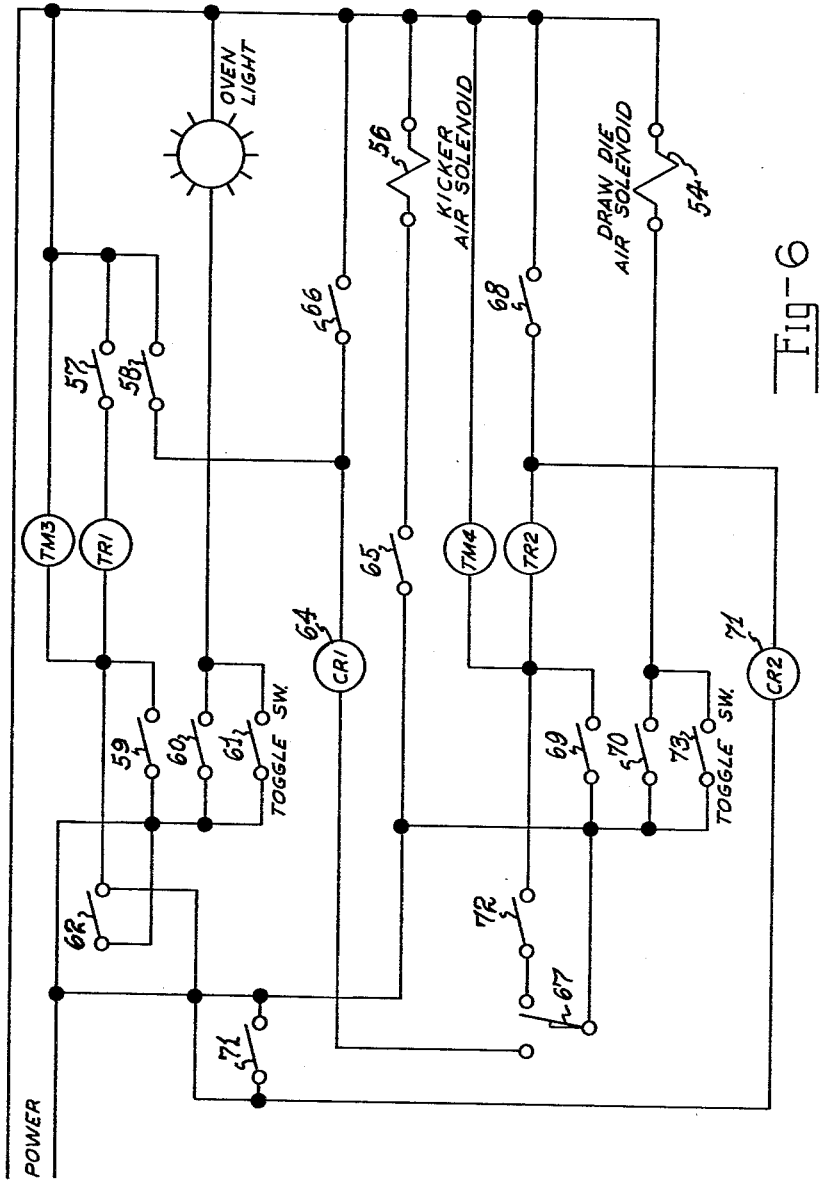

United States Patent Office 3,138,826
Patented June 30, 1964

3,138,826
SEMI-AUTOMATIC FORMING MACHINE AND PROCESS
William A. Jacobs and Kenneth A. Hornung, Ellenville, N.Y., assignors to Sun Chemical Corporation, New York, N.Y., a corporation of Delaware
Filed Oct. 12, 1961, Ser. No. 144,718
5 Claims. (Cl. 18—19)

This invention relates to a semi-automatic machine for forming flat-ware articles from foamed, thermoplastic sheets. More particularly, this invention relates to a machine for forming useful flat-ware articles from foamed polystyrene sheets by the use of drawing dies which are operated automatically.

It is a principal object of this invention to provide a machine which is versatile in operation to provide any desired number of flat-ware articles from foamed polystyrene sheet and which provides the ready interchangeability of drawing dies.

Another object is the provision of a machine for converting foamed thermoplastic sheets into useful flat-ware articles wherein the operations of heating and drawing are carried out by automatic means, thus providing close tolerances from article to article made by the machine.

A further object is the provision of a machine and process wherein automatic operation of the heating and drawing steps precludes the occurrence of accidents causing damage or injury to operators and/or equipment.

A still further object is to provide a machine wherein small quantities of useful flat-ware articles of various shapes and sizes can be readily made as desired.

Figure 1:
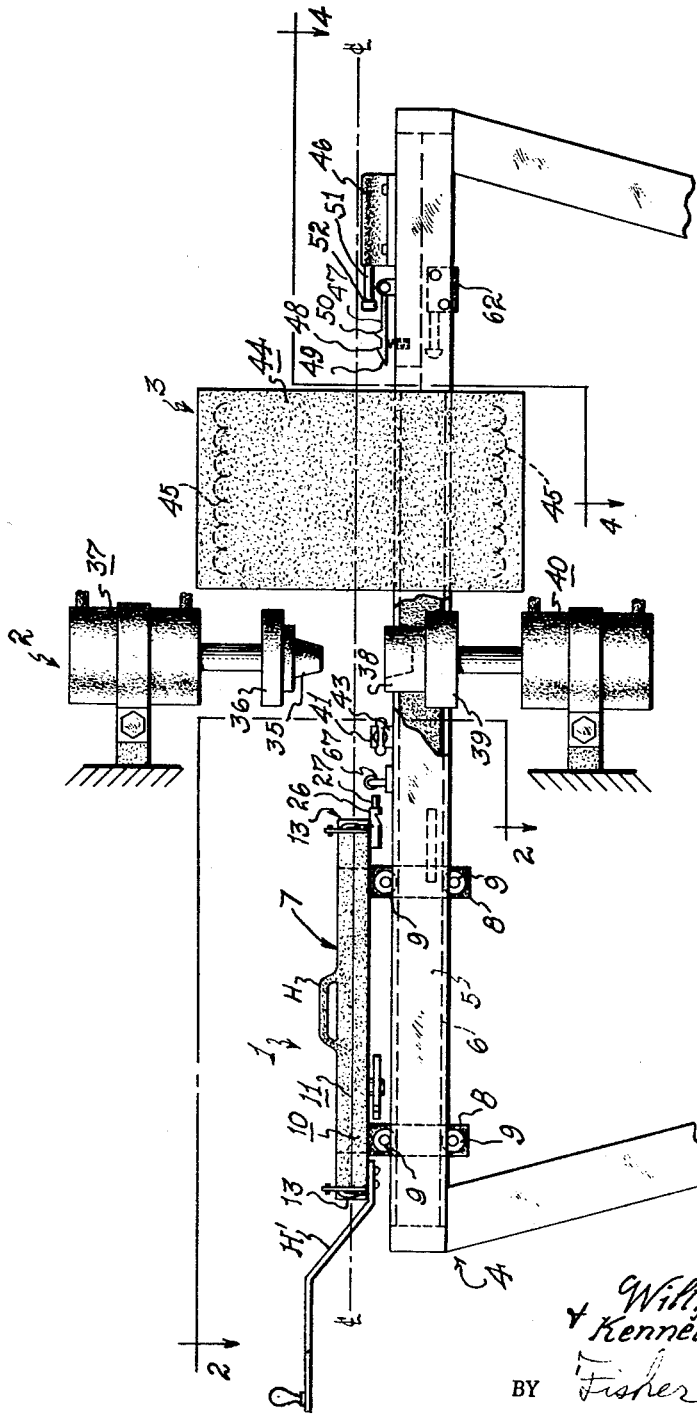
Figure 2:
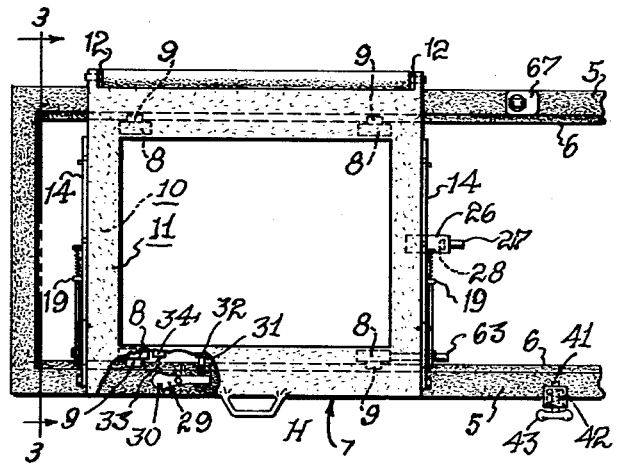
Figure 3:
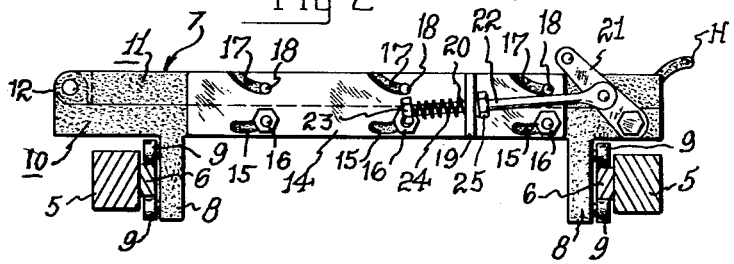
Figure 4:
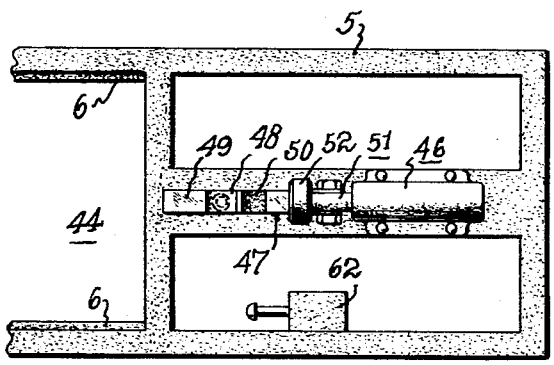

Other objects and advantages of this invention will be apparent from the following detailed description of a specific embodiment thereof taken in conjunction with the attached drawings in which:

FIG. 1 is a schematic side elevation of the novel machine wherein certain parts are partially cut away;
FIG. 2 is a section taken on line 2—2 of FIG. 1;
FIG. 3 is a section taken on line 3—3 of FIG. 2;
FIG. 4 is a section taken on line 4—4 of FIG. 1;
FIG. 5 is a schematic diagram of the fluid control and actuating system of the machine represented by the above figures;
FIG. 6 is a schematic wiring diagram of the electrical controls for the machine shown in the above figures.

Referring to FIG. 1, the machine of this invention is shown schematically in side elevation as having a loading, clamping, unclamping, and unloading zone 1; a draw-forming zone 2; and a heating zone 3. These zones are traversed by a frame 4 for supporting separated longitudinal beams 5, each of which has a rail 6 fixed thereto on the inner surface thereof. The longitudinal beams 5 are connected at each end by suitable cross beams. A carriage 7, having four legs 8, each of which has rotatably mounted thereon a pair of guide wheels 9, is supported for movement by the beams 5 and rails 6. The guide wheels 9 and legs 8 are so positioned on the carriage 7 with regard to the rails 6, such that each pair of guide wheels 9 on each leg 8 respectively engage the upper and lower surfaces of the rails 6. Thus, the carriage 7 is supported by the guide rails 6 and guided therealong by legs 8 and guide wheels 9.

The carriage 7 comprises a lower clamping frame 10 and an upper clamping frame 11. The upper clamping frame 11 overlies the lower clamping frame 10 and is pivoted on hinges 12 to the lower clamping frame 10. Along each of the transverse sides of clamping frames 10 and 11 is mounted a latching assembly 13 which comprises, as best shown in FIGS. 2 and 3, a latch plate 14 and a lower row of three lower inclined slots 15 through which pass pin bolts 16 horizontally attached to the transverse side of lower clamping frame 10, such that the latch plate 14 is slidable on the pin bolts 16 to raise or lower said plate relative to said lower clamping frame. The latch plate 14 also comprises a horizontal row of upper inclined slots 17 directed to converge with lower inclined slots 15 but not connecting therewith. The upper inclined slots 17 communicate at their upper ends with the upper free edge of the latch plate 14 and receive horizontal pins 18 attached to the transverse side of upper clamping frame 11 such that said pins 18 are slidable in the upper inclined slots 17 to elevate or lower the upper clamping frame 11 in relation to the latch plate 14. Attached intermediately along the side of latch plate 14 is a small bracket 19 having transverse bore 20 therethrough. A clamping lever 21 is pivoted for vertical movement on lower clamping frame 10 opposite the hinge 12. A connecting rod 22 having one end attached to the clamping lever 21 at a point spaced from the pivot point thereof extends from said clamping lever through the bore 20 of the bracket 19 and is terminated at the opposite end from said lever by a stop nut 23. A compression spring 24 is disposed around the clamping lever 21 between the stop nut 23 and the bracket 19 to urge said connecting rod 22 in a direction away from the clamping lever 21. A nut 25 is attached to the connecting rod 22 on the opposite side of the bracket 19 from the compression spring 24 and stop nut 23 to limit the movement of connecting rod 22 if desired.

In operation, when the clamping lever 21 is pivoted towards a vertical position, it pulls latch plate 14 to move it in relation to the upper and lower clamping frames 10 and 11 by virtue of the action of pins 18 in upper inclined slots 17 and pin bolts 16 in lower inclined slots 15. This action raises the upper clamping frame 11 in relation to the lower clamping frame 10 and positions the latch plate 14 such that the pins 18 will be released from the upper inclined slots 17 when the upper clamping frame 11 is raised, as by lifting handle H provided thereon. The upper clamping frame 11 is thereby freed for upward pivoting on hinge 12 to separate it from lower clamping frame 10 and permit insertion of the blank to be draw-formed or removal of the formed article.

When the blank is inserted the upper clamping frame 11 is pivoted downwardly to overlie lower clamping frame 10 and clamp the blank therebetween. The pins 18 on said upper clamping frame enter the upper inclined slots 17 of latch plate 14 and when the clamping lever 21 is pivoted downwardly the latch plate 14 moves the pins 18 toward the pin bolts 16, thus drawing the upper clamping frame 11 into tight engagement with the blank and lower clamping frame 10.

On the transverse side closest to the draw-forming zone 2 is mounted a latch-plunger cylinder 26 having a plunger 27 and a latch recess 28 on the under side of said cylinder. The plunger 27 is slidably mounted within the latch-plunger cylinder 26 and is spring urged outwardly of said cylinder by a coil spring (not shown) mounted within said cylinder. The operation of the latch-plunger cylinder 26, plunger 27 and latch recess 28 will be described hereinafter.

Along the transverse under side of lower clamping frame 10 opposite the hinges 12 is pivotally mounted a latch lever 29 which comprises a latch recess 30 at one end and a stop bolt 31 at its other end. The stop bolt 31 is adjustable and engages a limit projection 32 on the under side of lower clamping frame 10. The latch lever 29 is pring biased by spring 33 between a spring abutment 34 projecting from the under side of lower clamping frame 10 and the end of said lever wherein the latch recess 30 is positioned to urge said recessed end 30 outwardly. The operation of latch lever 29 will be described hereinafter.

Referring to FIG. 1, the draw-forming zone 2 comprises an upper male die 35 connected to an upper movable platen 36 which, in turn, is connected to the piston rod of an upper air or hydraulic cylinder 37. Below the male die 35 is positioned a lower female die 38 which is mounted on a lower movable platen 39 which is connected for vertical movement to the piston rod of lower air or hydraulic cylinder 40. The male die and female die are aligned for mating engagement and their operation and control will be described hereinafter.

A releasable, one-way stop latch 41 is mounted on longitudinal beam 5 at a point between the draw-forming zone 2 and loading, clamping, unclamping and unloading zone 1. The stop latch 41 operates in cooperation with latch lever and recess 29 and 30 respectively to position the carriage 7 between the male and female dies 35 and 38, such that the blank clamped by the upper and lower clamping frames 11 and 10 respectively is properly positioned between said dies for draw-forming. In this regard it will be noted that when the carriage 7 is moved from zone 1 through zone 2 the stop latch 41 overrides the latch lever and recess 29 and 30 respectively and does not stop movement of the carriage 7. However, when the carriage 7 is moved from zone 3 towards zones 2 and 1 the stop latch cannot override latch lever and recess 29 and 30 but engages recess 30 to stop and position carriage 7 with the blank between the male and female dies 35 and 38. Stop latch 41 is provided with spring means 42 and a handle 43, such that manual disengagement of said stop latch from the latch recess 30 can be accomplished. The position of latch lever 29 and latch recess 30 is adjustable by means of stop bolt 31.

Heating zone 3 comprises an oven 44 around the longitudinal beams 5 and guide rails 6, such that the carriage 7 can be contained completely by the oven 44. Heating means such as infra-red lamps 45 are provided in the oven 44 for heating the upper and lower sides of the blank clamped by the carriage 7. Suitable means for regulating the amount of heat supplied by the infrared lamps 45 are provided.

Referring to FIGS. 1 and 4, on the other side of the oven 44 from the draw-forming zone 2 there is mounted on frame 4 a kicker cylinder 46 and carriage catch 47. The carriage catch 47 is pivotally mounted at its end closest to kicker cylinder 46 and is spring biased at its other end in an upward direction. At its spring biased end, the carriage catch 47 is formed with a catch recess 48 and forward and rear cam surfaces 49 and 50 respectively. The kicker cylinder 46 has a piston rod 51 which is spring biased to move it into said cylinder, as best shown in FIG. 5, and movable by air applied to said cylinder outwardly of said cylinder. The free end of piston rod 51 has connected thereto a contact-release nut 52 and is aligned with the carriage catch 47, such that outward movement of the piston rod 51 by air applied to the cylinder 46 causes the contact-release nut 52 to engage the rear cam surface 50 of said catch to pivot said catch downwardly.

In operation, latch-plunger cylinder 26 mounted on the carriage 7 engages and overrides forward cam surface 49 until latch recess 28 of said latch-plunger cylinder 26 engages latch recess 48 of carriage catch 47. At the same time, plunger 27 of the latch-plunger cylinder 26 engages the contact release nut 52 of the kicker cylinder 46. Thus, the carriage catch 47 holds the carriage 7 within the oven 44. After a predetermined time has elapsed, depending upon the desired amount of heating, a control mechanism, to be hereinafter described, operates to supply air to kicker cylinder 46 moving contact-release nut 52 against plunger 27 to load the spring contained by latch-plunger cylinder 26 and thereafter to engage the rear cam surface 50 of carriage catch 47 thereby depressing said carriage catch and releasing it from latch-plunger cylinder 26. The loaded spring contained by latch-plunger cylinder 26 then urges plunger 27 outwardly with sufficient force against contact-release nut 52 to propel the carriage 7 out of the oven 44 into zone 2 wherein the carriage movement is stopped by the cooperative operation of stop latch 41 and latch lever and recess 29 and 30 respectively as hereinbefore described.

Referring now to FIG. 5, there is shown the pneumatic or hydraulic system for operating the upper and lower air cylinders 37 and 40 respectively and the kicker cylinder 46. The flow of air from the air supply as shown in FIG. 5 to the upper and lower cylinders 37 and 40 is controlled by a four-way valve 53 which is energized by a die solenoid 54, such that when the die solenoid 54 is actuated air is supplied respectively to the outer ends of said cylinders 37 and 40 to move the respective pistons thereof toward each other and when die solenoid 54 is de-energized, spring bias actuates the four-way valve 53 to exhaust the outer ends of said cylinders 37 and 40 and supply air to the inner ends of said cylinders to move said piston rods away from each other. Suitable flow controllers, filters, pressure regulators, air lubricators, quick exhaust devices and mufflers are provided in the system as shown.

The kicker cylinder 46, as shown in FIG. 5, is connected to the air supply through a three-way valve 55 which is actuated by a kicker solenoid 56, such that when the kicker solenoid 56 is energized air flows to the kicker cylinder 46 and when the kicker solenoid 56 is de-energized the cylinder 46 is connected to exhaust and the air supply is shut off.

FIG. 6 diagrammatically illustrates the electrical control system and specifically the electrical control system for the die solenoid 54 and the kicker solenoid 56. There is shown two basic circuits, one for controlling the residence time of the carriage 7 in the oven 44 (upper circuit) and the other a circuit for activating the die solenoid 54 for coordinating and timing the drawing operation (lower circuit).

The timing circuit for regulating the residence time of the carriage 7 in the oven 44 comprises a timer motor TM–3 and timer relay TR–1, timed-to-open contacts 57, timed-to-close contacts 58, two timer relay contacts 59 and 60, and toggle switch 61. The circuit is controlled by a limit switch 62 which is mounted on longitudinal beam 5, as best shown in FIGS. 1 and 4. The limit switch 62 is actuated by contact peg 63 mounted in alignment therewith on leg 8 of carriage 7. When the carriage 7 moves into the oven 44 contact peg 63 engages limit switch 62 to actuate it. As shown in FIG. 5, the closing of limit switch 62 energizes the timer relay TR–1 and the timer motor TM–3. Timer relay TR–1 closes timer relay contacts 59 and 60. Timer relay contact 60 energizes the oven light as an indication that timing has begun. After the timer motor TM–3 has completed its cycle, the timed-to-open contacts 57 open, thus de-energizing the timer relay TR–1 which opens the timer relay contacts 59 and 60 to de-energize the timer circuit. Timed-to-close contacts 58 simultaneously close to complete a circuit through a circuit relay 64 which controls circuit relay contacts 65 and 66 which respectively connect the circuit relay 64 to power, thus allowing the timer circuit to reset and connects the kicker solenoid 56 to power to actuate the kicker mechanism thereby propelling the carriage 7 to the forming zone 2.

As the carriage 7 reaches the forming zone 2, it contacts a micro switch 67 mounted on longitudinal beam 5.

As shown in FIG. 6, micro switch 67 disconnects circuit relay 64 from power to open the circuit relay contacts 65 and 66 and thus de-energize the kicker solenoid 56 which then releases the three-way valve for spring biased movement to connect the kicker cylinder 46 to exhaust and thereby allowing the piston rod 51 thereof to be withdrawn from said kicker cylinder under spring bias.

The electrical circuit for actuating the die solenoid 54 comprises a timer motor TM–4 which controls timed-to-open contacts 68; a timer relay TR–2 which controls timer relay contacts 69 and 70; a second circuit relay CR-2 which controls circuit relay contacts 71 and 72; a toggle switch 73; micro switch 67, and die solenoid 57. The second circuit relay CR-2 is previously energized by the closing of limit switch 62 to thereby close circuit relay contacts 71 and 72. When circuit relay contacts 71 are closed the second circuit relay CR-2 is connected to power independently of the opened or closed position of limit switch 62 and circuit relay contacts 72 close and place the die solenoid circuit into condition for energization when the micro switch 67 is actuated. It will be seen, in this manner, that the kicker solenoid circuit must first be energized, i.e., limit switch 62 must first be closed, and the kicker solenoid circuit must complete its full cycle before the die solenoid circuit can be energized. With circuit relay contacts 71 and 72 closed the closing of the micro switch 67 connects timer motor TM-4 and timer relay TR-2 to power, closing the timer relay contacts 69 and 70 thereby connecting the die solenoid to power. After timer motor TM-4 has run its complete cycle it actuates timed-to-open switch 68 which disconnects the timer relay TR-2 and second circuit relay CR-2 from power, thereby opening timer contacts 69 and 70 and circuit relay contacts 71 and 72 to completely disconnect the die solenoid from power and de-energize the die solenoid circuit regardless of the position of micro switch 67.

Toggle switches 61 and 73 permit optional manual operation.

In overall operation, the operator lifts upper clamping frame 11, inserts a blank of foamed polystyrene sheet between said upper clamping frame and lower clamping frame and then lowers said upper clamping frame into overlying contact with said lower clamping frame. The clamping levers 21 are then pivoted downwardly toward the upper clamping frame 11 to lock the two clamping frames together. The carriage 7 then is rolled past draw-forming zone 2 into the oven 44 where the latch recess 28 of latch-plunger cylinder 26 connected to the carriage 7 engages catch recess 48 of carriage catch 47. At the same time contact peg 63 actuates limit switch 62 to begin the kicker solenoid timing cycle as described above. At the end of the timing cycle the kicker solenoid 56 is energized to actuate three-way valve 55 to supply air to the kicker cylinder 46 causing piston rod 51 to move outwardly, such that contact-release nut 52 moves against plunger 27 to load the spring of latch-plunger cylinder 26 and also depresses carriage catch 47, thus releasing it from the latch-plunger cylinder 26. Plunger 27 then moves against nut 52 to propel carriage 7 out of the oven 44 and into the draw-forming zone 2. As the carriage 7 moves through draw-forming zone 2, the stop latch 41 engages latch lever 29 and latch recess 30 to stop the carriage 7 and hold it in draw-forming position. At the same time, micro switch 67 is contacted and actuated by carriage 7 to initiate the timing cycle of the die solenoid circuit which, in turn, simultaneously energizes die solenoid 54 which actuates four-way valve 53 to supply air to the outer ends of cylinders 37 and 40. The movable platens 36 and 39 are then caused to move toward each other until the male and female dies 35 and 38 come into mating engagement. At the end of the timed cycle, the die solenoid 54 is de-energized, thereby permitting the four-way valve to be spring actuated to admit air to the inner ends of cylinders 37 and 40 while exhausting the outer ends thereof. The platens 36 and 39 are thus caused to move out of mating engagement and free the formed article for removal from the draw-forming zone 2. The operator then manually withdraws the carriage 7 by releasing stop latch 41 and pulling the carriage into the loading, clamping, unclamping, and unloading zone 1. A suitable handle H is attached to the carriage for moving it into the oven or moving it from the draw-forming zone 2 back to zone 1. The operator then releases clamping lever 21 by moving it upwardly to free the upper clamping frame 11 from the lower clamping frame 10. The upper clamping frame 11 then is pivoted upwardly about hinge 12 and the formed article is removed. The male and female dies 35 and 38 respectively are preferably cooled, as by circulating cooling fluid within said dies in order to accelerate the gelling time of the thermoplastic foamed sheet, such that the dies can be quickly separated and the shaped article will retain its shape.

What is claimed is:

1. A machine for draw-forming flat-ware articles from foamed thermoplastic sheets comprising movable means for clamping said sheets in position for draw-forming; heating means for applying heat to said sheets; draw-forming means between said movable means and said heating means, said movable means being movable past said draw-forming means into said heating means; timed means operable on said movable means for ejecting said movable means out of said heating means into draw-forming position with relation to said draw-forming means; stop means for stopping said movable means when it reaches its draw-forming position in relation to said draw-forming means; first timing means actuable by said movable means when it is positioned in said heating means for actuating said timed means after the expiration of a predetermined time; and second timing means actuable by said movable means when it is positioned in said draw-forming means, said timing means sequentially actuating, retracting and deactuating said draw-forming means.

2. A machine as claimed in claim 1 wherein said movable means comprises a clamping device movably mounted on rails which extend on each side of said draw-forming means and into said heating means.

3. A machine as claimed in claim 2 wherein said timed means comprises catch means for engaging and holding said movable means within said heating means and a fluid actuating cylinder which is actuated by said first timing means to eject said movable means from said heating means after a predetermined period of time.

4. A machine as claimed in claim 3 wherein said second timing means comprises a micro switch actuated by contact with said movable means when said movable means is disposed in draw-forming position.

5. A machine as claimed in claim 4 wherein said first timing means acts on said second timing means to place it in energizable condition when said timed means is actuated.

References Cited in the file of this patent
UNITED STATES PATENTS

| | | |
|---|---|---|
| 1,110,282 | Askew et al. | Sept. 8, 1914 |
| 2,580,883 | Borkland | Jan. 1, 1952 |
| 2,836,852 | Butzko | June 3, 1958 |
| 2,987,770 | Powell | June 13, 1961 |